(12) United States Patent
Elian et al.

(10) Patent No.: US 12,135,853 B2
(45) Date of Patent: Nov. 5, 2024

(54) ULTRASONIC TOUCH SENSOR

(71) Applicant: Infineon Technologies AG, Neubiberg (DE)

(72) Inventors: Klaus Elian, Alteglofsheim (DE); Horst Theuss, Wenzenbach (DE)

(73) Assignee: Infineon Technologies AG, Neubiberg (DE)

(*) Notice: Subject to any disclaimer, the term of this patent is extended or adjusted under 35 U.S.C. 154(b) by 219 days.

(21) Appl. No.: 17/823,372

(22) Filed: Aug. 30, 2022

(65) Prior Publication Data

US 2023/0063120 A1 Mar. 2, 2023

(30) Foreign Application Priority Data

Aug. 31, 2021 (DE) .......................... 102021122461.6
Aug. 30, 2022 (DE) .......................... 102022121884.8

(51) Int. Cl.
*G06F 3/043* (2006.01)
*B06B 1/02* (2006.01)

(52) U.S. Cl.
CPC .......... *G06F 3/0436* (2013.01); *B06B 1/0292* (2013.01)

(58) Field of Classification Search
CPC ........................... G06F 3/0436; B06B 1/0292
See application file for complete search history.

(56) References Cited

U.S. PATENT DOCUMENTS

| 5,673,041 | A | 9/1997 | Chatigny et al. |
| 2006/0103003 | A1* | 5/2006 | Heide ............... H01L 23/315 |
| | | | 257/E23.128 |
| 2008/0116765 | A1* | 5/2008 | Sugiura ............... B06B 1/0629 |
| | | | 310/334 |
| 2008/0130935 | A1* | 6/2008 | Sato ............... H04R 1/2884 |
| | | | 381/361 |
| 2017/0263569 | A1* | 9/2017 | Sommer ............. H01L 25/0652 |
| 2020/0413202 | A1* | 12/2020 | Kusano ............... B06B 1/0611 |
| 2021/0003534 | A1* | 1/2021 | Lal ........................ G06F 3/0416 |

FOREIGN PATENT DOCUMENTS

DE 102005040081 B4 6/2012

* cited by examiner

*Primary Examiner* — Wing H Chow
(74) *Attorney, Agent, or Firm* — Harrity & Harrity, LLP

(57) ABSTRACT

What is proposed is an ultrasonic touch sensor having a contact surface for attaching the ultrasonic touch sensor to a casing, having a first ultrasonic transducer element, having a first semiconductor chip, wherein the first semiconductor chip comprises the first ultrasonic transducer element, wherein the first semiconductor chip is potted into a potting compound in such a way that a first cutout is formed from the first ultrasonic transducer element to the contact surface of the ultrasonic touch sensor, and wherein the potting compound forms the housing of the ultrasonic touch sensor.

12 Claims, 9 Drawing Sheets

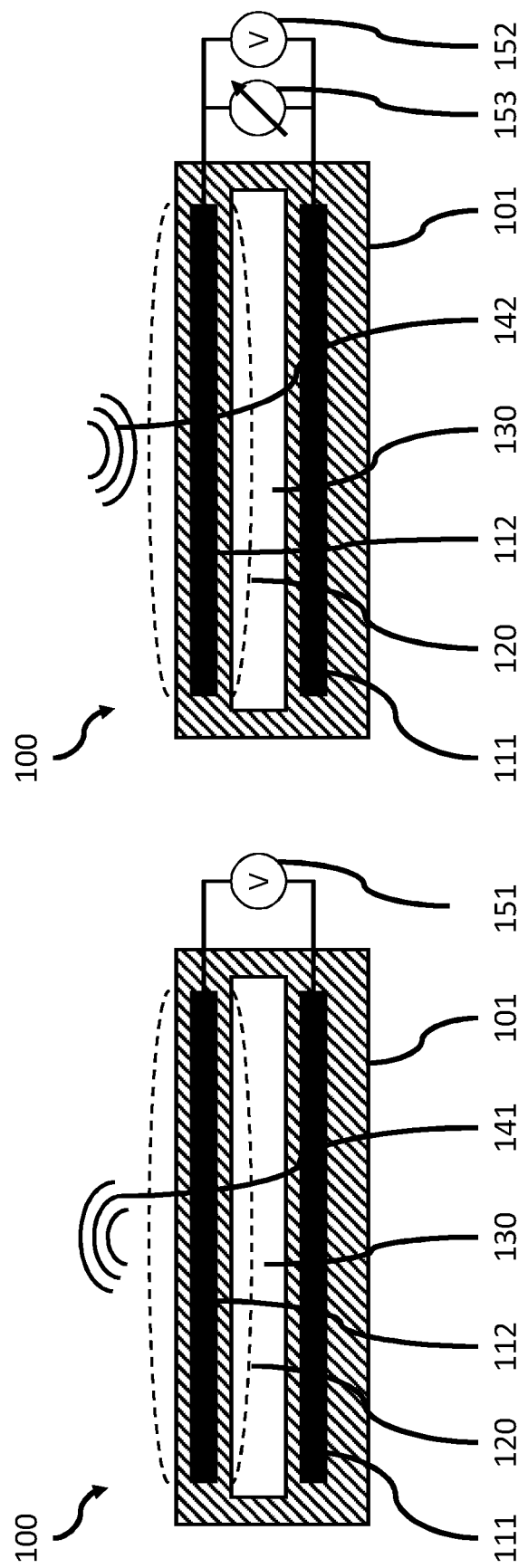

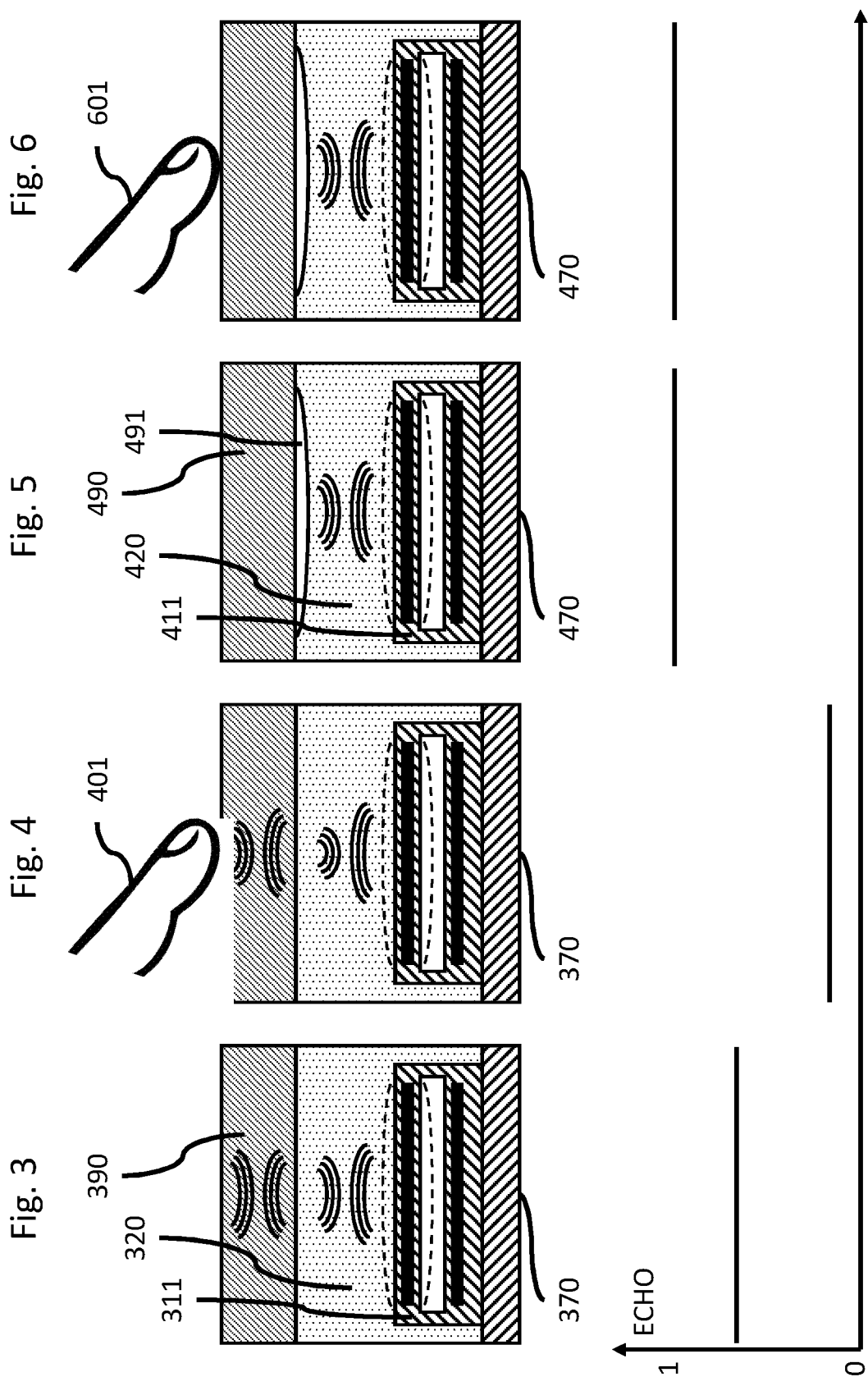

ULTRASONIC TOUCH SENSOR

CROSS REFERENCE TO RELATED APPLICATIONS

This application claims priority to German Patent Application No. 102021122461.6 filed on Aug. 31, 2021, and German Patent Application No. 102022121884.8 filed on Aug. 30, 2022, the content of which are incorporated by reference herein in their entirety.

BACKGROUND

Interaction of a user with an electronic system is necessary in many fields of application. In a motor vehicle, for example, a switch for actuating the windshield ventilation and a corresponding display are required. Touch sensors are often used as switches. Capacitive touch sensors are subject to restrictions with regard to the material of the surface on which they are intended to detect touches. By way of example, it is not routinely possible to combine a metallic touch surface with a capacitive touch sensor. In the case of ultrasonic touch sensors, the touch surface can consist of different materials. However, a good acoustic coupling to the touch surface is required in order to be able to reliably ascertain a touch.

Taking this as a departure point, the object of the present implementation consists in providing an ultrasonic touch sensor which can be manufactured in a simple manner.

The object has been achieved by the subject matter of the main claim. Advantageous implementations are specified in the dependent claims.

BRIEF DESCRIPTION OF THE DRAWINGS

Examples of the proposed ultrasonic touch sensor will now be explained in greater detail with reference to the drawings. In the drawings:

FIG. 1 shows an ultrasonic transducer element;
FIG. 2 shows an ultrasonic transducer element;
FIG. 3 shows an ultrasonic transducer element in a first situation;
FIG. 4 shows the ultrasonic transducer element shown in FIG. 3 in a second situation;
FIG. 5 shows an ultrasonic transducer element in a third situation;
FIG. 6 shows the ultrasonic transducer element shown in FIG. 5 in a fourth situation.

DETAILED DESCRIPTION

Figure 7:
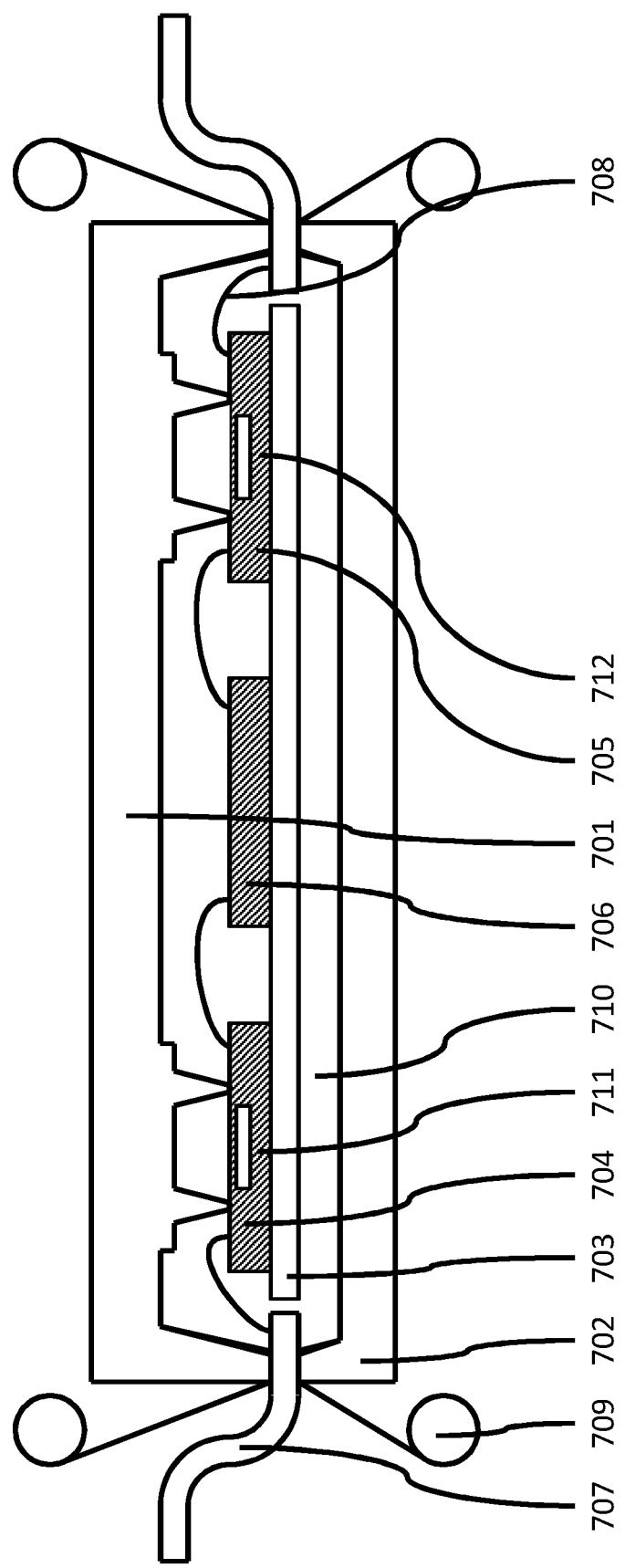
FIG. 7 shows a step for producing an ultrasonic touch sensor.

FIGS. 1 and 2 illustrate an ultrasonic transducer element 100. The ultrasonic transducer element 100 comprises a membrane 120 with an electrode 112 and a substrate 101 with an electrode 111. A cavity 130 is provided between the membrane 120 and the substrate 101, and enables a movement of the membrane 120.

Applying an AC voltage between the electrodes 111 and 112 using a voltage source 151 enables the membrane 120 to be excited to oscillate, such that the ultrasonic transducer element 100 can transmit ultrasonic waves 141.

The ultrasonic transducer element 100 shown in FIGS. 1 and 2 can likewise be used to detect ultrasonic waves 142. For this purpose, a DC voltage can be applied between the electrodes 111 and 112 using the voltage source 152. The ultrasonic waves 142 can excite the membrane 120 to oscillate. An AC voltage is induced owing to the resulting changing distance between the electrodes 111 and 112, and can be measured by a measuring device 153.

FIGS. 3 to 6 schematically illustrate how the ultrasonic transducer element 311 or respectively 411 can be used to detect a touch of a casing 390, 490 on the opposite side of the casing 390, 490 with respect to the ultrasonic touch sensor. The ultrasonic transducer element 311 or respectively 411 is in each case embedded in an encapsulation layer 320, 420, the encapsulation layer 320, 420 having a contact surface, by which the ultrasonic touch sensor is attached to the casing 390, 490. The ultrasonic transducer element 311, 411 can in each case be secured on a printed circuit board 370, 470 and can be electrically connected thereto.

As shown in FIG. 3, ultrasonic waves can be generated using the ultrasonic transducer element 311, which are transmitted substantially completely through the interface between the encapsulation layer 320 and the casing 390 and are subsequently reflected at the free surface of the casing 390 on the opposite side with respect to the encapsulation layer 320. After repeated transmission through the interface between the casing 390 and the encapsulation layer 320, the ultrasonic waves can be detected by the sensor element 311 again, such that an echo signal, as is shown under FIG. 3, is obtained.

In the case where the free surface of the casing 390 on the opposite side with respect to the encapsulation layer 320 is touched, for example by a finger 401, only a smaller proportion of the ultrasonic waves is reflected at the free surface and the echo signal decreases, as is illustrated under FIG. 4.

FIG. 5 illustrates that a hollow space 491 remained when the ultrasonic touch sensor was attached to the casing 490. The hollow space 491 has the consequence that the ultrasonic waves transmitted by the sensor element 411 do not pass through the interface between the encapsulation layer 420 and the casing 490, but rather are reflected at this interface, such that an echo signal, as is illustrated underneath, is obtained.

Since the ultrasonic waves are not (or hardly) transmitted into the casing, the echo signal is not changed as a result of the casing 490 being touched by the finger 601.

Even though a capacitive sensor element 311, 411 has been described above, corresponding considerations are also applicable to a piezoelectric sensor element, in particular to ultrasonic transceivers which operate according to a piezoelectric measurement principle.

FIG. 7 illustrates a step for producing an ultrasonic touch sensor. A carrier 703 is arranged between a first mold half 701 and a second mold half 702, a first semiconductor chip 704, a second semiconductor chip 705 and a third semiconductor chip 706 being secured on the carrier. The first semiconductor chip 703 comprises a first ultrasonic transducer element 711 and the second semiconductor chip 705 comprises a second ultrasonic transducer element 712. Furthermore, electrical terminals 707, e.g., in the form of a leadframe, are provided, by which the ultrasonic touch sensor can later be electrically connected to evaluation circuits. The electrical terminals 707 can be connected to the semiconductor chips 704, 705, 706 by way of wires 708. The third semiconductor chip 706 can comprise for example an integrated circuit for generating or evaluating the signals emitted or received at the ultrasonic transducer elements 711, 712.

A film 709 can be provided at the surface of the first mold half 701 and/or the second mold half 702, which film can result in improved sealing of the hollow space 710 formed between the first mold half 701 and the second mold half 702.

The hollow space 710 formed between the first mold half 701 and the second mold half 702 can subsequently be filled with a potting compound 810 in order to obtain the ultrasonic touch sensor 800 illustrated in FIGS. 8 and 9. In this case, the potting compound 810 forms the housing of the ultrasonic touch sensor 800. The method for producing the ultrasonic touch sensor 800 can in particular also comprise film assisted molding.

Figure 8:
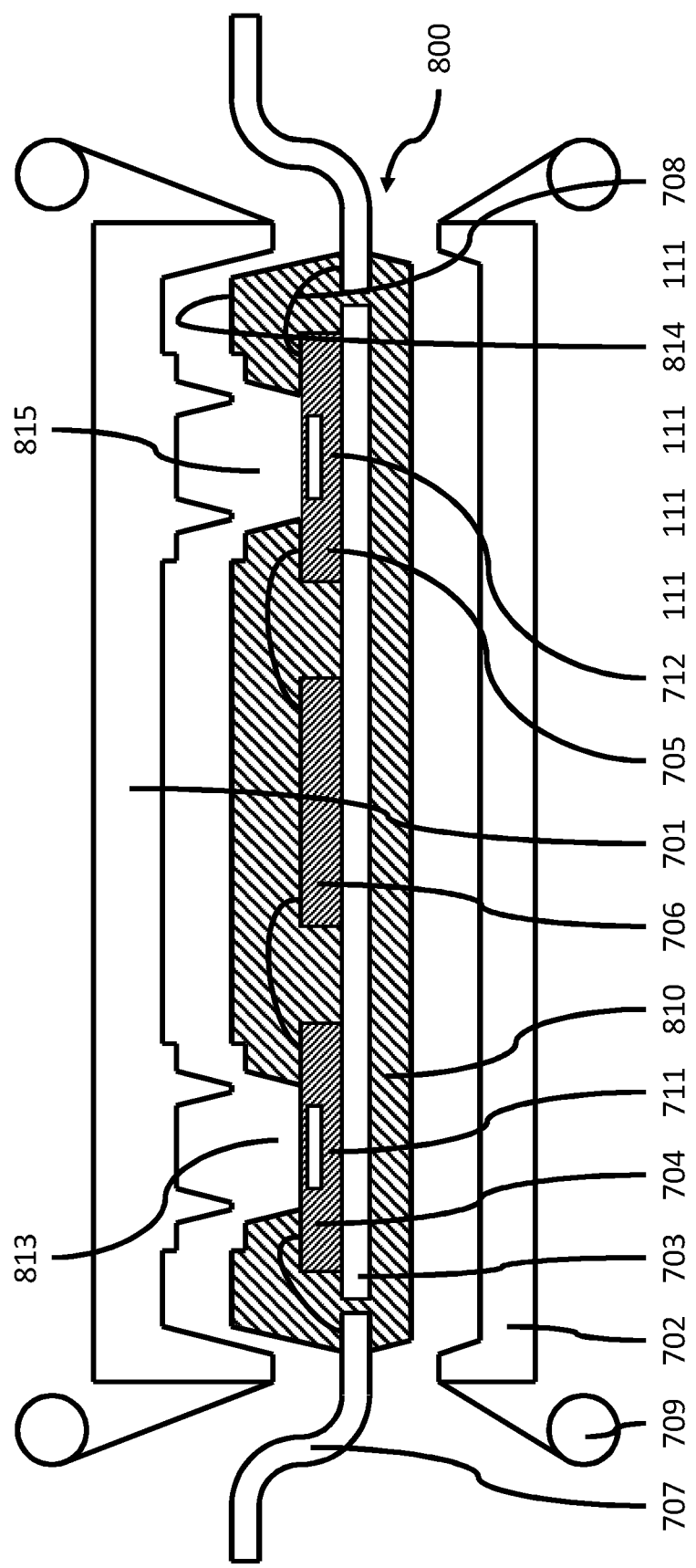
FIG. 8 shows a step for producing an ultrasonic touch sensor.
Figure 9:
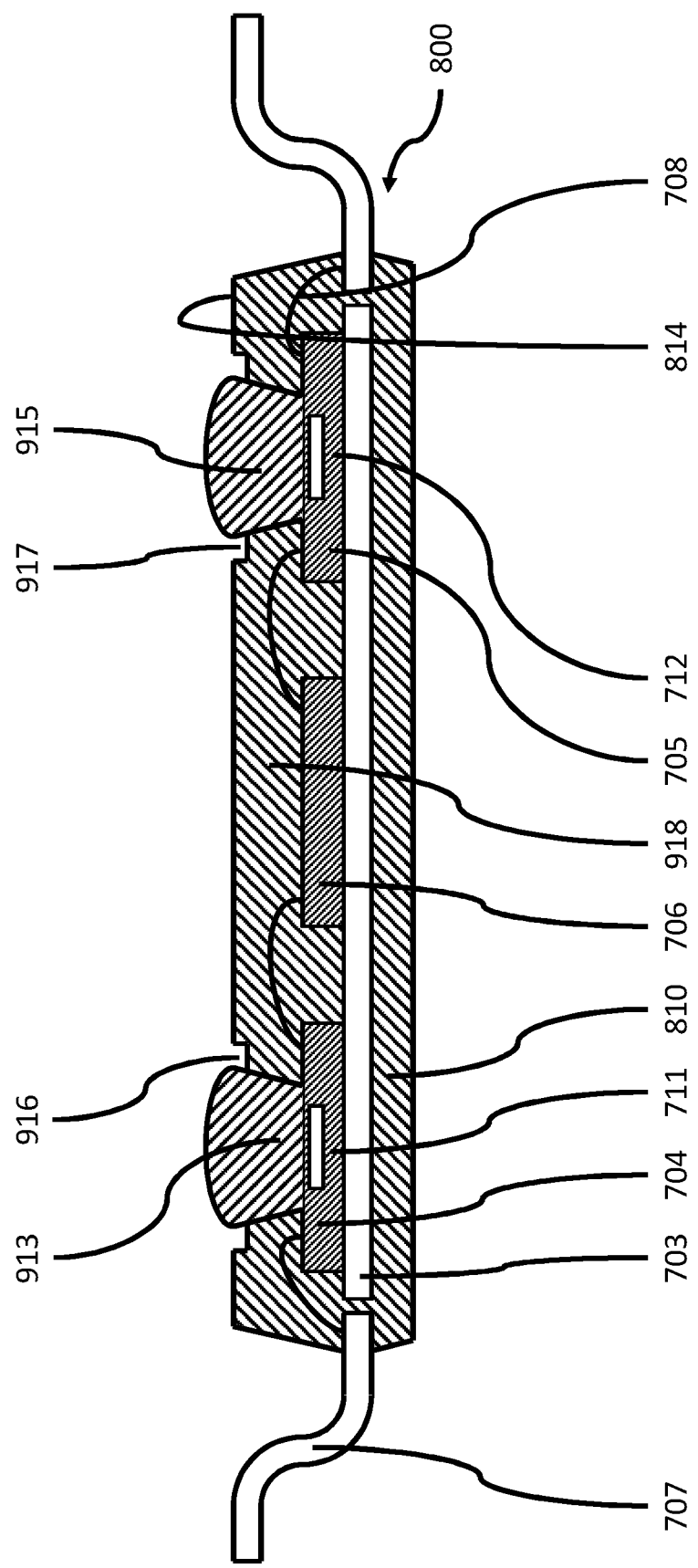
FIG. 9 shows an ultrasonic touch sensor.

The ultrasonic touch sensor 800 illustrated in FIGS. 8 and 9 comprises a contact surface 814 for attaching the ultrasonic touch sensor 800 to a casing. The ultrasonic touch sensor 800 comprises a first semiconductor chip 704 comprising a first ultrasonic transducer element 711. The first semiconductor chip 704 is potted into the potting compound 810 in such a way that a first cutout 813 is formed from the first ultrasonic transducer element 711 to the contact surface 813 of the ultrasonic touch sensor 800. In this case, the potting compound 810 forms the housing of the ultrasonic touch sensor 800.

Furthermore, the ultrasonic touch sensor 800 can comprise a second ultrasonic transducer element 712, wherein a second cutout 815 of the housing 810 extends from the second ultrasonic transducer element 712 to the contact surface 814. The second ultrasonic transducer element 712 can be arranged in a second semiconductor chip 705, as is shown in FIGS. 7 to 9. This can make it easier to provide a larger distance between the first ultrasonic transducer element 711 and the second ultrasonic transducer element 712. However, it is likewise conceivable for the second ultrasonic transducer element to be arranged in the first semiconductor chip. In this way, the number of semiconductor chips required for an ultrasonic touch sensor can be reduced and the production outlay can be decreased.

The first cutout 813 and/or the second cutout 815 can be at least partly filled with an acoustic coupling material 913, 915 for the acoustic coupling of the first ultrasonic transducer element 711 and/or second ultrasonic transducer element 712 to the casing.

The first cutout 813 and/or the second cutout 815 can have a reserve clearance 916, 917. The reserve clearance is configured to receive excess acoustic coupling material 913, 915 when the ultrasonic touch sensor is attached to the casing.

The first ultrasonic transducer element 711 can comprise an ultrasonic receiver and the second ultrasonic transducer element 712 can comprise an ultrasonic transmitter.

The first cutout 813 and the second cutout 815 can be separated from one another by a barrier 918. The barrier 918 can reduce the probability and/or intensity of direct reception—by the second ultrasonic transducer element 712—of an acoustic ultrasonic signal emitted by the first ultrasonic transducer element 711. The risk of an incorrect detection of a touch of the casing can thus be reduced.

Figure 10:
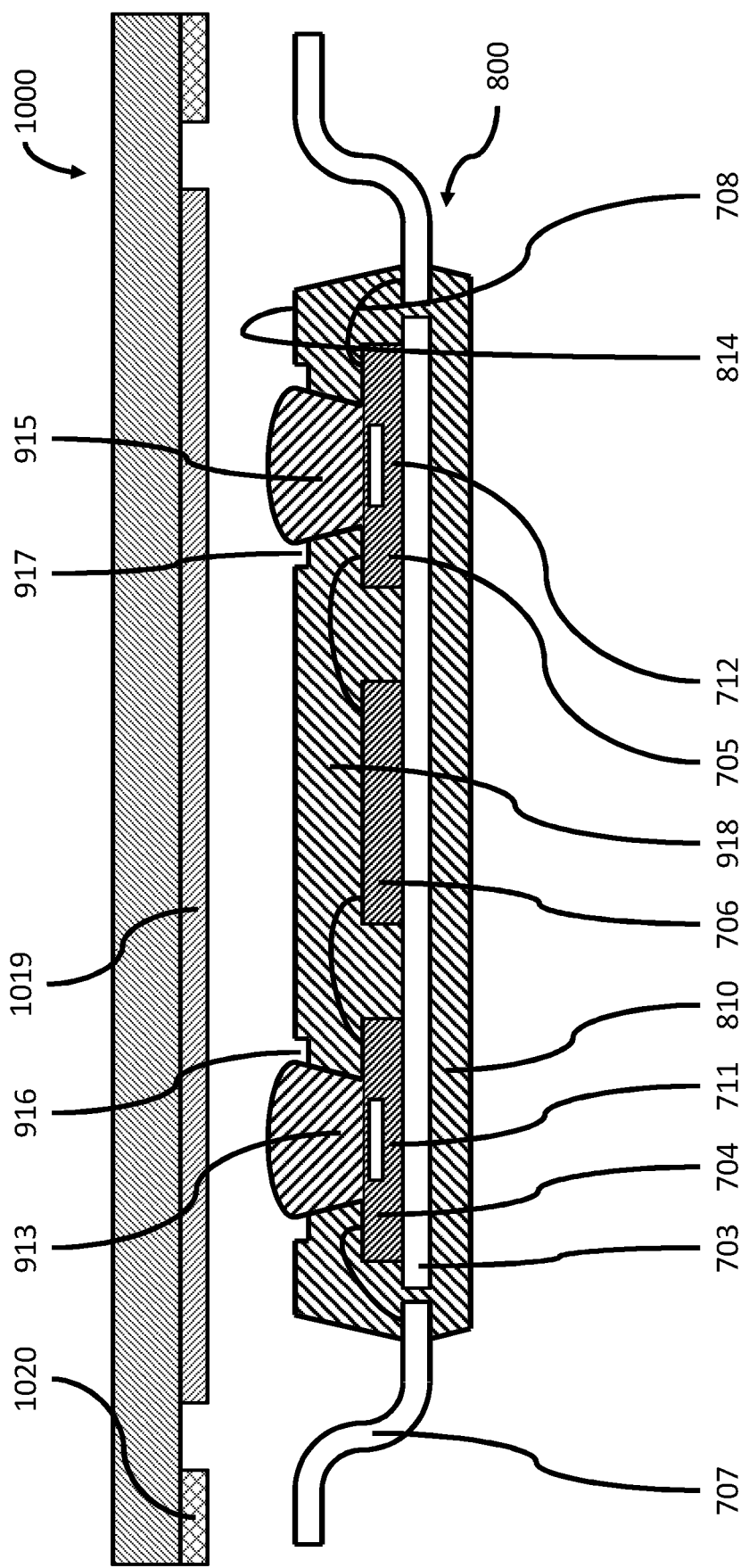
FIG. 10 shows an ultrasonic touch sensor and a casing.

FIG. 10 illustrates the ultrasonic touch sensor 800 together with a casing 1000. The casing 1000 has an adhesive layer 1019, with the aid of which the ultrasonic touch sensor 800 can be secured to the casing 1000. In addition, contact surfaces 1020 are provided on the casing 1000, and make electrical contact with the electrical terminals 707 of the ultrasonic touch sensor 800 when the ultrasonic touch sensor 800 is attached. In this case, the simultaneous electrical and mechanical contacting facilitates the production of the apparatus which is intended to be equipped with the ultrasonic touch sensor 800. In principle, however, it is also conceivable to ensure the electrical connection in a different way, for example by way of additional plug connectors.

Figure 11:
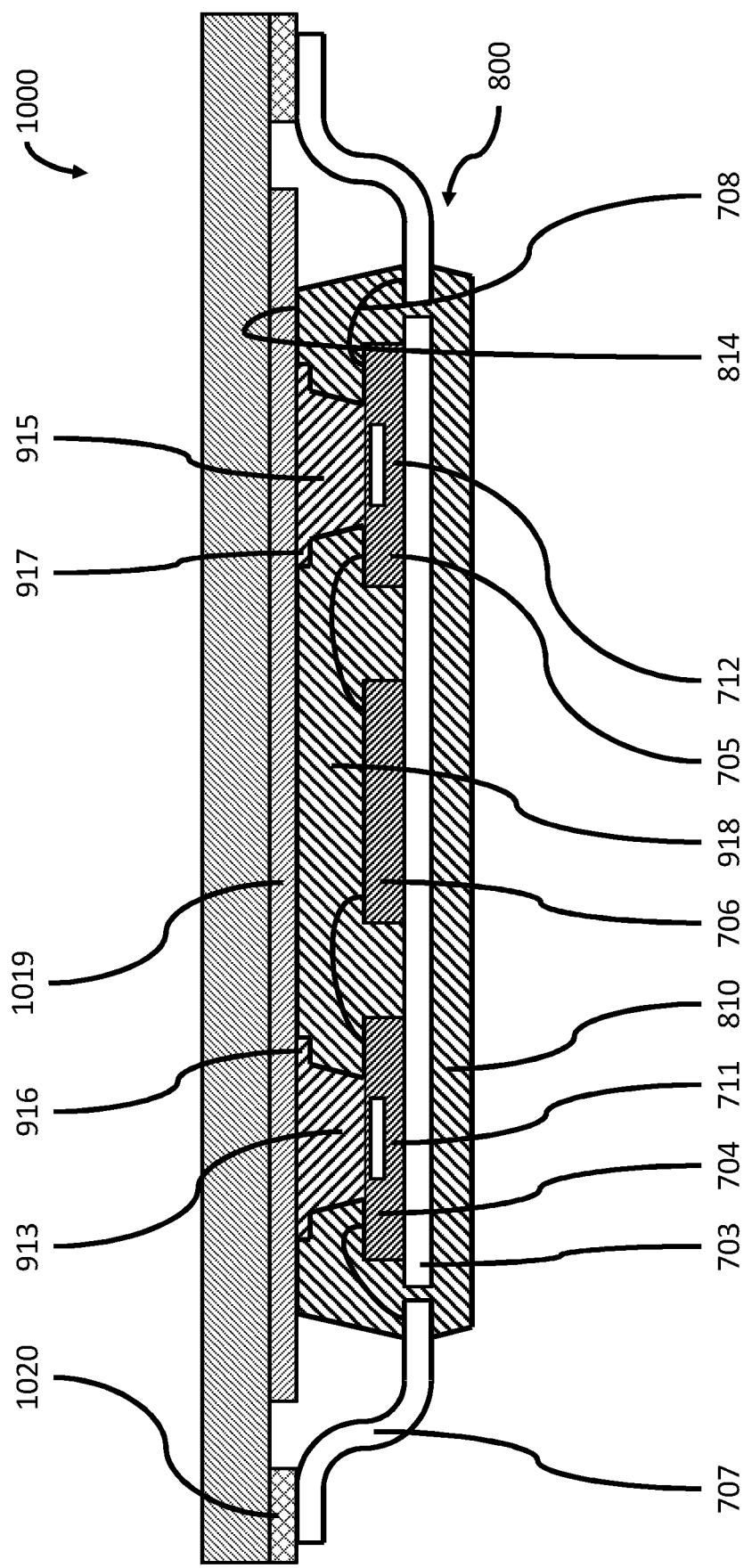
FIG. 11 shows the ultrasonic touch sensor according to FIG. 10 attached to the casing.

FIG. 11 shows the ultrasonic touch sensor 800 in the state attached to the casing 1000. In this case, the reserve clearances 916, 917 have received the acoustic coupling material 913, 915 that was displaced when the ultrasonic touch sensor was attached to the casing.

Figure 12:
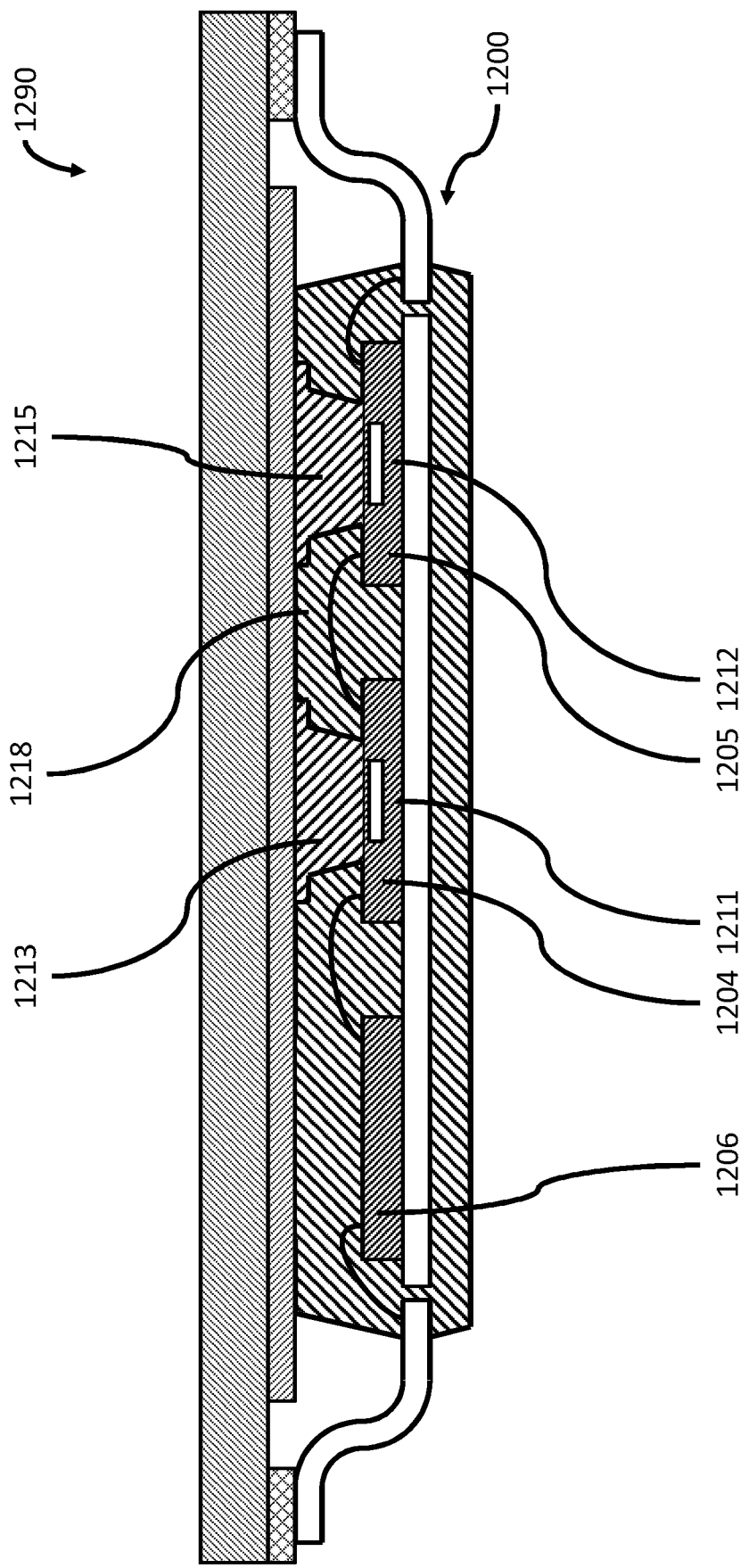
FIG. 12 shows an ultrasonic touch sensor attached to a casing.

FIG. 12 illustrates a further ultrasonic touch sensor 1200 attached to a casing 1290. In contrast to the ultrasonic touch sensor 800, in the case of the ultrasonic touch sensor 1200, the third semiconductor chip 1206 is not arranged between the first semiconductor chip 1204 and the second semiconductor chip 1205, rather the first semiconductor chip 1204 is arranged between the third semiconductor chip 1206 and the second semiconductor chip 1205. The first semiconductor chip 1204 having the first ultrasonic transducer element 1211 can thus be arranged closer to the second semiconductor chip 1205 having the second ultrasonic transducer element 1212. The risk of the first ultrasonic transducer element 1211 and the second ultrasonic transducer element 1212 acoustically influencing one another can be reduced by a barrier 1218 between the first cutout 1213 and the second cutout 1215.

Figure 13:
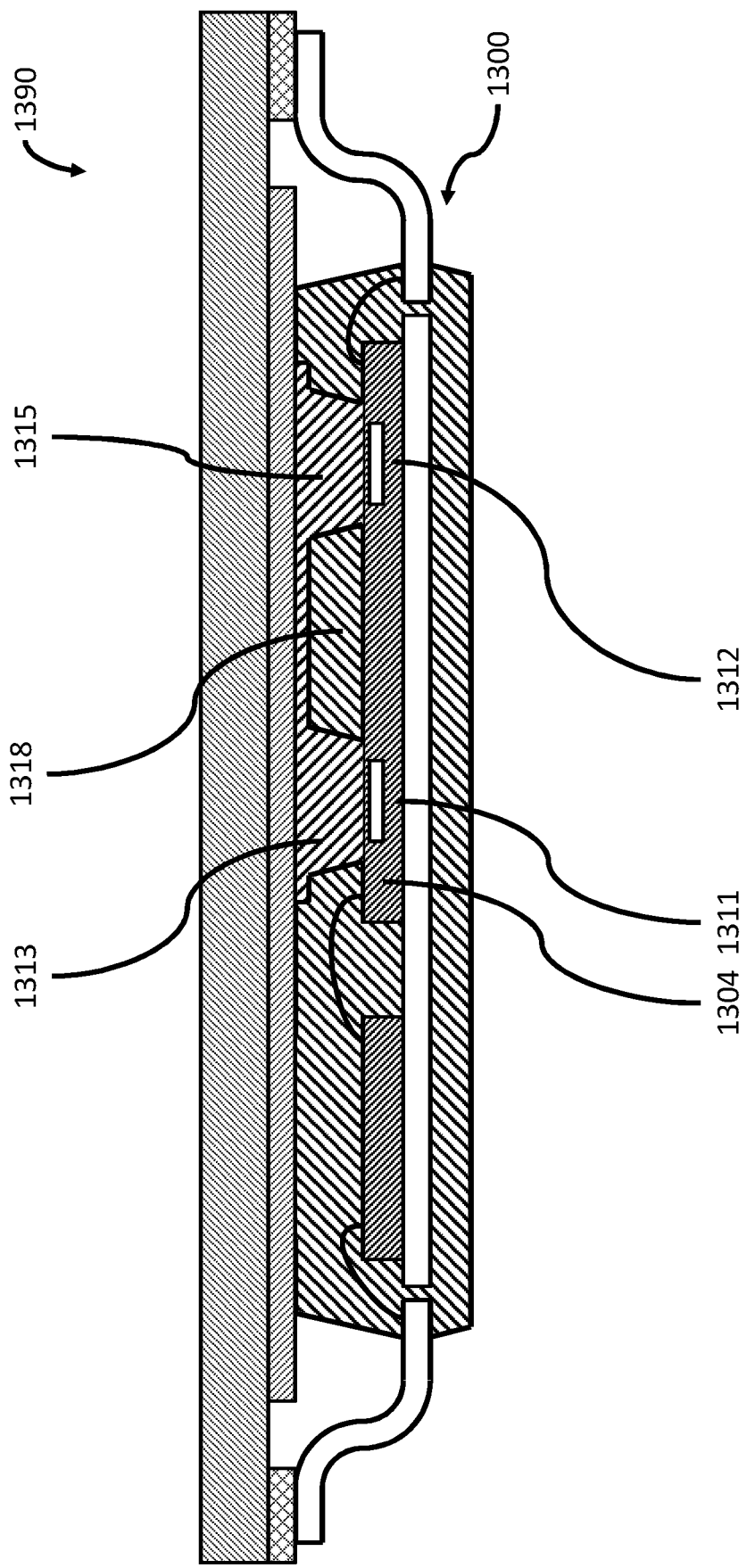
FIG. 13 shows an ultrasonic touch sensor attached to a casing.

In the case of the ultrasonic touch sensor 1300 illustrated in FIG. 13, a first ultrasonic sensor element 1311 and a second ultrasonic sensor element 1312 are both arranged in a first semiconductor chip 1304. A barrier 1318 between the first cutout 1313 and the second cutout 1315 can be spaced apart from the contact surface of the casing 1390. This can simplify the securing of the ultrasonic touch sensor 1300, and the risk of the first ultrasonic transducer element 1311 and the second ultrasonic transducer element 1312 acoustically influencing one another can nevertheless be reduced in this case. However, it is also conceivable to provide a barrier extending as far as the contact surface in the case of a plurality of ultrasonic transducer elements per semiconductor chip. The barrier can likewise be spaced apart from the contact surface in the case of the ultrasonic touch sensors illustrated in FIGS. 8 to 12.

ASPECTS

Some example implementations are defined by the following aspects:

Aspect 1. An ultrasonic touch sensor having a contact surface for attaching the ultrasonic touch sensor to a casing, having a first ultrasonic transducer element, having a first semiconductor chip, wherein the first semiconductor chip comprises the first ultrasonic transducer element, wherein the first semiconductor chip is potted into a potting compound in such a way that a first cutout is formed from the first ultrasonic transducer element to the contact surface of the ultrasonic touch sensor, and wherein the potting compound forms the housing of the ultrasonic touch sensor.

Aspect 2. The ultrasonic touch sensor according to aspect 1, wherein the ultrasonic touch sensor is formed by film assisted molding.

Aspect 3. The ultrasonic touch sensor according to aspect 1 or 2, having a second ultrasonic transducer element, wherein a second cutout of the housing extends from the second ultrasonic transducer element to the contact surface.

Aspect 4. The ultrasonic touch sensor according to any of aspects 1 to 3, wherein the first cutout and the second cutout are separated from one another by a barrier.

Aspect 5. The ultrasonic touch sensor according to aspect 4, wherein the barrier extends as far as the contact surface.

Aspect 6. The ultrasonic touch sensor according to aspect 4, wherein the barrier is spaced apart from the contact surface.

Aspect 7. The ultrasonic touch sensor according to any of aspects 3 to 6, wherein the second ultrasonic transducer element is arranged in the first semiconductor chip.

Aspect 8. The ultrasonic touch sensor according to any of aspects 3 to 6, wherein the second ultrasonic transducer element is arranged in a second semiconductor chip.

Aspect 9. The ultrasonic touch sensor according to any of aspects 3 to 8, wherein the first ultrasonic transducer element comprises an ultrasonic receiver and the second ultrasonic transducer element comprises an ultrasonic transmitter.

Aspect 10. The ultrasonic touch sensor according to any of aspects 1 to 9, wherein the first cutout and/or the second cutout are/is at least partly filled with an acoustic coupling material for the acoustic coupling of the first ultrasonic transducer element and/or second ultrasonic transducer element to the casing.

Aspect 11. The ultrasonic touch sensor according to aspect 10, wherein the first cutout and/or the second cutout have/has a reserve clearance, wherein the reserve clearance is configured to receive excess acoustic coupling material when the ultrasonic touch sensor is attached to the casing.

Aspect 12. The ultrasonic touch sensor according to any of aspects 1 to 11, wherein the ultrasonic touch sensor has at the contact surface electrical terminals for electrically connecting the ultrasonic sensor to the casing.

Although specific example implementations have been illustrated and described in this description, persons having customary knowledge in the art will recognize that a large number of alternative and/or equivalent implementations can be chosen as substitution for the specific example implementations shown and described in this description, without departing from the scope of the implementation disclosed. The intention is for this application to cover all adaptations or variations of the specific example implementations discussed here. Therefore, the intention is for this implementation to be restricted only by the claims and the equivalents of the claims.

What is claimed is:

1. An ultrasonic touch sensor comprising:
   a contact surface for attaching the ultrasonic touch sensor to a casing,
   a first ultrasonic transducer element,
   a first semiconductor chip, wherein the first semiconductor chip comprises the first ultrasonic transducer element,
   wherein the first semiconductor chip is potted into a potting compound in to form a first cutout from the first ultrasonic transducer element to the contact surface of the ultrasonic touch sensor, and
   wherein the potting compound forms a housing of the ultrasonic touch sensor.

2. The ultrasonic touch sensor as claimed in claim 1,
   wherein the ultrasonic touch sensor is formed by film assisted molding.

3. The ultrasonic touch sensor as claimed in claim 1, further comprising:
   a second ultrasonic transducer element,
   wherein a second cutout of the housing extends from the second ultrasonic transducer element to the contact surface.

4. The ultrasonic touch sensor as claimed in claim 3,
   wherein the second ultrasonic transducer element is arranged in the first semiconductor chip.

5. The ultrasonic touch sensor as claimed in claim 3,
   wherein the second ultrasonic transducer element is arranged in a second semiconductor chip.

6. The ultrasonic touch sensor as claimed in claim 3,
   wherein the first ultrasonic transducer element comprises an ultrasonic receiver and the second ultrasonic transducer element comprises an ultrasonic transmitter.

7. The ultrasonic touch sensor as claimed in claim 1,
   wherein a barrier separates the first cutout from the second cutout.

8. The ultrasonic touch sensor as claimed in claim 7,
   wherein the barrier extends to the contact surface.

9. The ultrasonic touch sensor as claimed in claim 7,
   wherein the barrier is spaced apart from the contact surface.

10. The ultrasonic touch sensor as claimed in claim 3,
    wherein one or more of the first cutout or the second cutout is at least partly filled with an acoustic coupling material for the acoustic coupling of the one or more of the first ultrasonic transducer element or the second ultrasonic transducer element to the casing.

11. The ultrasonic touch sensor as claimed in claim 10,
    wherein one or more of the first cutout or the second cutout has a reserve clearance,
    wherein the reserve clearance is configured to receive excess acoustic coupling material when the ultrasonic touch sensor is attached to the casing.

12. The ultrasonic touch sensor as claimed in claim 1,
    wherein the ultrasonic touch sensor has, at the contact surface, electrical terminals for electrically connecting the ultrasonic sensor to the casing.

* * * * *

UNITED STATES PATENT AND TRADEMARK OFFICE
CERTIFICATE OF CORRECTION

| | | |
|---|---|---|
| PATENT NO. | : 12,135,853 B2 | Page 1 of 1 |
| APPLICATION NO. | : 17/823372 | |
| DATED | : November 5, 2024 | |
| INVENTOR(S) | : Klaus Elian et al. | |

It is certified that error appears in the above-identified patent and that said Letters Patent is hereby corrected as shown below:

In the Claims

Claim 1:
Column 6, Line 10, change "potting compound in to form a first cutout from the first" to -- potting compound to form a first cutout from the first --

Claim 7:
Column 6, Line 33, change "The ultrasonic touch sensor as claimed in claim 1," to -- The ultrasonic touch sensor as claimed in claim 3, --

Signed and Sealed this
Fourteenth Day of October, 2025

John A. Squires
*Director of the United States Patent and Trademark Office*